United States Patent [19]
Schneider

[11] 3,950,093
[45] Apr. 13, 1976

[54] METHOD AND APPARATUS FOR PRINTING COLOURED ORIGINALS

[75] Inventor: Bruno Schneider, Kloten-Augwil, Switzerland

[73] Assignee: Gretag Aktiengesellschaft, Kloten-Augwil, Switzerland

[22] Filed: Sept. 24, 1974

[21] Appl. No.: 508,853

[30] Foreign Application Priority Data
Oct. 12, 1973 Germany............................ 2351377

[52] U.S. Cl..................................... 355/37; 355/77
[51] Int. Cl.²................... G03B 27/54; G03B 27/76; G03B 27/32
[58] Field of Search............. 355/37, 70, 71, 77, 38

[56] References Cited
UNITED STATES PATENTS

| | | | |
|---|---|---|---|
| 2,553,285 | 5/1951 | Thomas................................ | 355/37 |
| 2,985,062 | 5/1961 | Clapp.................................... | 355/37 |
| 3,222,985 | 12/1965 | Remesat................................ | 355/37 |
| 3,345,509 | 10/1967 | Dauser................................. | 355/37 X |
| 3,684,371 | 8/1972 | Weisglass et al................... | 355/37 X |
| 3,760,174 | 9/1973 | Boenning et al................... | 355/70 X |
| 3,825,336 | 7/1974 | Reynolds............................. | 355/37 X |

*Primary Examiner*—Richard A. Wintercorn
*Attorney, Agent, or Firm*—Pierce, Scheffler & Parker

[57] ABSTRACT

A light source of adjustable colour is provided, primarily for use in apparatus for printing coloured originals. The invention is primarily useful in printing photographs.

According to one aspect of the invention there is provided a light source of adjustable colour, comprising three light emitters of seperately adjustable intensity, a light mixer adapted to mix light emitted by the emitters into one beam, and filtering means whereby the first emitter emits light containing one additive primary colour, the second emitter emits light containing the same colour and one other additive primary colour, and the third emitter emits light of all three additive primary colours.

The colour emitted by all the emitters, and therefore most easily adjustable to be richest in the final light beam, is, when the light is used for printing photographs, that colour which takes longest to develop.

13 Claims, 3 Drawing Figures

METHOD AND APPARATUS FOR PRINTING COLOURED ORIGINALS

FIELD OF THE INVENTION

This invention relates to a light source of adjustable colour, and to a method of using the same for printing coloured originals. The source is of the type having three light emitters of adjustable intensity, to provide the three additive primary colours of the printing light. The method is of the kind in which the light intensities are measured and controlled in accordance with predetermined criteria after passing through, or being reflected from, the original, the printing light used being a mixed light consisting of three fractions originating from separate light sources.

BACKGROUND OF THE INVENTION

For the printing of coloured originals, particularly photographic negatives, it is known to carry out the exposure operation in the form of three successive part-exposures, each in one additive primary colour, and at the same time control the action of the printing light on the printing material separately in accordance with the individual primary colours. A white printing light source is usually used for this purpose, colour filters in the individual primary colours being successively swung into the path of the rays of said light source. The disadvantage of this method, in which the part-exposures are carried out successively, is that the total exposure time is relatively long as a result.

It is also known first to expose the printing material with white light and then successively interpose colour filters in the additive primary colours in the path of the light, the periods of interposition in each case being sufficient for the required amounts of printing light in the primary colours to reach the printing material during the exposure without the filter and during the successive subsequent exposures, in the primary colours. This known method, however, gives only a relatively small reduction of the printing time.

Instead of using a single white printing-light source and colour filters, it is also known to use three printing lamps of adjustable intensity which each emit light in one of the three additive primary colours, and to expose the printing material to the three primary colours simultaneously. Although this method does give a reduction of the total exposure time, the printing light produced by each lamp is low in relation to the total lamp power required, and the method is therefore uneconomic. Of the total light emitted by each printing lamp, the only fraction effectively used is the fraction containing the particular primary colour for the printing operation. The remaining light fractions are for the most part converted into heat as a power loss.

It is an object of the invention to provide an improved light source for providing light of adjustable colour, primarily for use in printing coloured originals. However, the source is capable of application in other fields where a light source that is easily adjustable as to colour is required.

GENERAL FEATURES OF THE INVENTION

According to the invention there is provided a light source of adjustable colour, comprising three light emitters of separately adjustable intensity, a light mixer adapted to mix light emitted by the emitters into one beam, and filtering means whereby the first emitter emits light containing one additive primary colour, the second emitter emits light containing the same colour and one other additive primary colour, and the third emitter emits light of all three additive primary colours.

LIST OF THE DRAWINGS

For a better understanding of the invention, and to show how the same may be carried into effect, reference will now be directed to the accompanying drawing wherein:

FIG. 1 is a highly simplified general view of apparatus including a light source, in accordance with the invention, FIG. 2 is a block of a control system, for the apparatus shown in FIG. 1, and FIG. 3 is a diagram showing the sequence of events with the block schematic according to FIG. 2.

DESCRIPTION OF THE PREFERRED EMBODIMENTS

It has now been found that the light yield in relation to the lamp power can be greatly improved in a printing method as described above. The total exposure time can be greatly reduced in comparison with the last-mentioned known method, if the light is formed from three fractions, the first fraction consisting of one additive primary colour, the second fraction containing the same colour and one other additive primary colour and the third fraction consisting of all three additive primary colours. White or white with a slight blue or magenta cast is preferably used as the colour for the third fraction of the printing light, yellow for the second fraction, and red for the first.

In the preferred embodiment for apparatus for printing according to the method, three separate light emitters are combined with a light mixer, and means for controlling the intensities of these three light emitters, said means comprising a photoelectric transducer disposed in the path of the rays of the printing light for each of the three additive primary colours in which the first light emitter emits light of a first additive primary colour, the second light emitter emits light in this first and in another additive primary colour, and the third light emitter emits light in all three primary colours.

Figure 1:
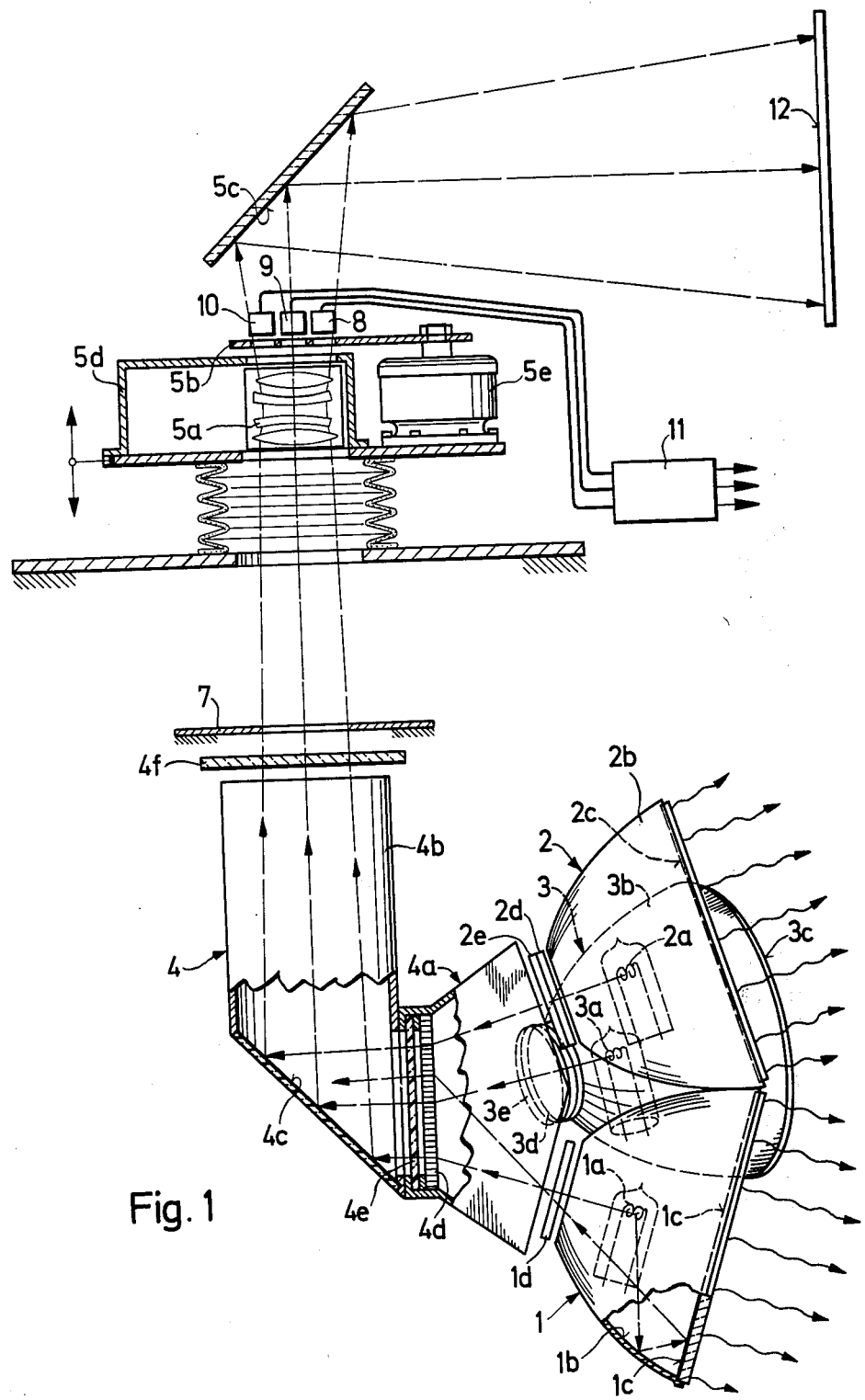

FIG. 1 shows only the essential features of printing apparatus for photographic negatives comprising a light source illuminating the original and a shutter mechanism for exposing the photosensitive material to the light passing through the original.

The illumination system comprises three separate light sources 1, 2 and 3 and a light mixer 4. Each of the three light emitters, which are completely identical, consists of an incandescent hologen lamp 1a, 2a and 3a, an elliptical reflector 1b, 2b and 3b, and a cold-light mirror 1c, 2c and 3c, respectively. The light mixer 4 comprises an internally silvered funnel-shaped converging element 4a and a light trap 4b. The three light emitters, 1, 2 and 3 are disposed directly in front of the wider end of the converging element 4a and radiate into the latter. The light then passes into the trap 4b where a deflecting mirror 4c disposed at its bottom end deflects the light upwards in the direction of the trap axis. The trap 4b may be hollow with silvered inner walls or else be solid, for example, made of clear plastics. A heat-reflecting filter 1d, 2d and 3d is provided in the path of the rays of each light emitter before entry to the converging element 4a. A subtractive colour filter 2e, a yellow filter in this case, is disposed in the path of the rays of one of the three light emitters, and an additive colour filter 3e, in this case a red filter, is disposed in the path of the rays of one of the other two light emitters, the additive primary colour of this filter being one of the two additive primary colours passed by the subtractive filter 2e, and the third light emitter 1 has no color filter and hence emits light in all three additive primary colours.

The converging element 4a could be replaced by a tripod-like arrangement of optical fibres, in which case the light emitters would each be disposed in front of one of the three limbs of the arrangement and the limbs would lead into the light trap. Each optical fibre may be hollow with silvered inner walls or be solid, for example made from plastics.

So that the three different coloured light fractions may be mixed more homogeneously, a laminated mixer element 4d and a diffusion screen 4e are disposed in the path of the rays of the printing light at the exit of the converging element 4a. Another diffusion screen 4f is provided at the exit of the light trap 4b. The laminated mixer element consists of a number of parellel sheet-metal laminations with reflecting surfaces extending parallel to the axis of symmetry of the converging element. The light, which is incident at an angle to the laminations, is partially reflected by the latter and improves the illumination of the original.

The illuminating system comprising the light emitters 1, 2, and 3 and the light mixer 4 is contained in a casing together with a cooling system (not shown).

A mounting for an original, such as a photographic negative, (not shown) is disposed above the trap 4b and the diffusion screen 4f. A lens 5a, a shutter 5b and a deflecting mirror 5c are disposed above the mount. The lens 5a is accommodated in a light-tight protective housing 5d and can be moved away from or towards the mount 7 for focusing purposes. The shutter 5b is situated in the path of the rays of the printing light between the lens 5a and the deflecting mirror 5c and is actuated by a drive element 5e, for example a rotating magnet. Three windows are disposed in the shutter and through each of them the printing light can pass to a photosensitive element 8, 9 and 10, which may be, for example, a photoelectric cell or a photodiode. The windows are each provided with a colour filter of a different additive primary colour, i.e., a red, blue and green filter. Alternatively the photosensitive elements are so constructed as to respond selectively to any one of these primary colours. The provision of the photosensitive elements directly on the shutter is particularly advantageous, since as a result they are in the immediate proximity of the lens and the light intensities picked up by them are relatively independent of the pattern of the original, because in that case the areas of the elements are large relative to the total area of the protected image at that point. This applies not only to printing apparatus of the present kind, but to all cases where colour values have to be measured as integrally as possible and independently of the pattern.

The output signals of the elements 8, 9, and 10 are fed to a triple amplifier 11, from which they are fed to the control circuit (FIG. 2) for controlling the intensity of the lamps 1a, 2a and 3a.

The above described printing apparatus operates as follows: the fractions of the total printing light emitted by the three light emitters 1, 2 and 3 are a white-light fraction, a yellow-light fraction and a red-light fraction. These are combined in the converging element and then pass through the laminated mixer element 4d and the diffusion screen 4e into the trap 4b by then already relatively well mixed, and in the trap they are mixed still further so that a practically homogeneous mixed light is present at the exit from the trap. This mixed light then passes through the original secured in the mounting 7 and to the photoelectric cells 8, 9 and 10 via the windows in the shutter 5b, which has now been swung into the path of the printing light. After the printing light has passed through the original, the photoelectric cells measure the content of each of the three additive primary colours. The proportions of the additive primary colours are then balanced to require values by varying the intensities of the lamps to predetermined criteria, for example the grey criterion by means of the electronic control circuit. When the balancing operation is finished, the shutter 5b is moved out of the path of the rays and the photosensitive printing material (not shown) secured to a mounting 12 is exposed by the balanced mixed light.

The procedure for balancing the printing light is as follows, by way of example the original is first of all subjected only to the white-light fraction of the printing light emitted by the light emitter which has no colour filter. The lamp intensity is then controlled so that the blue content assumes a desired value. Blue is chosen in this because it is the only additive primary colour in the white light fraction which is contained only in said white light but not in the other two printing light fractions. The fraction containing the two additive primary colours, i.e. yellow in this case, is then added to the white-light fraction and the intensity of the associated light source is controlled so that the green content aasumes a desired value. This colour is common to the white light fraction and the added light fraction having the substractive colour alone, but not to the single-colour fraction. Finally, the third fraction of the mixed light (red in this case) is added and the content of the additive primary colour occurring in all three mixed light fractions (i.e. red) is adjusted similarly.

For the sake of convenience, the balancing of the printing light is carried out as follows: the original is subjected to the mixed light made up of the three fractions: white, yellow (i.e. green-red) and red. The blue-content of the mixed light is then adjusted to a set value by varying the intensity of the white light, and this value is maintained. The green-content of the mixed light is then adjusted solely by varying the yellow-light intensity. Given the fixed white and yellow light intensities, the red content is then corrected by varying the red light intensity. Exposure is then effected after this balancing operation.

It has been found in practice that the white light fraction provides an excessive green and/or red light fraction for certain originals. In such cases, therefore, it is advantageous to attenuate the red and/or green fraction in the white light fraction by interposing a light magenta or blue filter. The fractions of these two primary colours in the associated printing light fractions are then correspondingly weaker than in the case of a white light fraction having an equal proportion of each colour.

Figure 2:
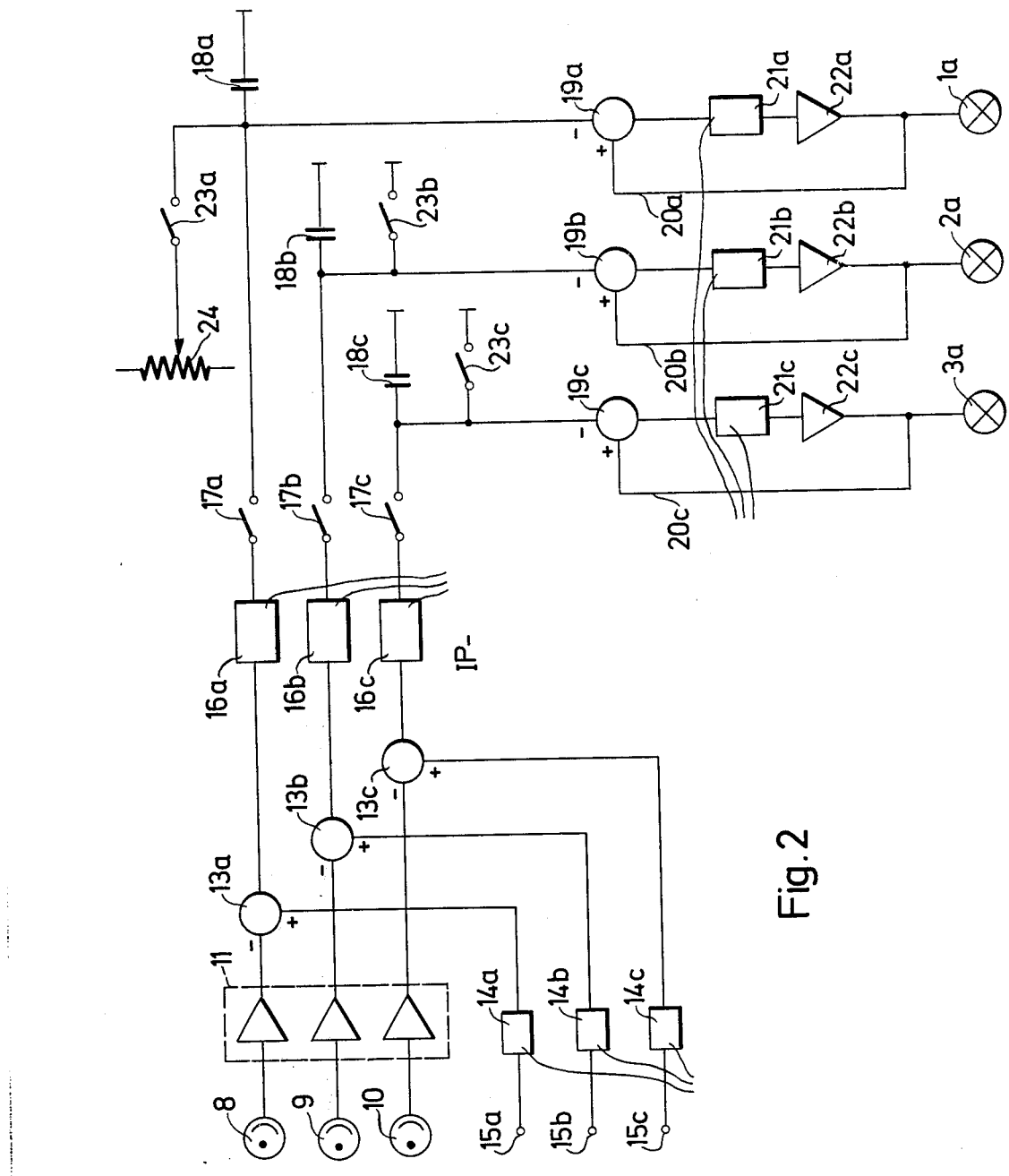

FIG. 2 is a schematic drawing of an electronic control system for the mixed light. The complete control system consists essentially of an independent control circuit for each of the lamps 1a, 2a and 3a. The signals produced in the photosensitive elements 8, 9 and 10 in the shutter 5b are amplified in the abovementioned triple amplifier 11 and then are each fed to a comparison stage 13a, b and c respectively, where the signals are compared with associated signals 15a, b and c denoting desired fractions of the three additives primary colours in the mixed light, these desired-value signals 15a, b and c being produced in a network (not shown) and their anti-logarithms being formed in each case in an anti-logarithm stage 14a, b and c. The desired values of the three primary colours can be selected individually by way of set-value controllers (not shown). The differential signals formed in this way between the actual and desired values of the individual primary colours are each fed to an integral-proportional control element 16a, b and c, which forms a control signal therefrom and applies the same for storage purposes to a capacitor 18a, b and c via a switch 17a, b and c in each case.

Control signals stored in the capacitors then pass in each case to another composition stage 19a, b and c respectively, where they are compared with the actual values of the respective electrical lamp outputs, as indicated by the loops 20a, b and c. The output signals formed in these comparison stages then each control a pulse width modulator 21a, b and c, which in turn each drive a power amplifier 22a, b and c. The power amplifiers supply pulse width modulated voltage to the light emitters 1a, 2a and 3a. The secondary control circuits indicated by the feedback loops 20a, b, and c serve for compensating for any mains voltage variations or other external factors.

For erasure of the information stored in the capacitors, capacitors 18b and c are each bridged by a switch 23b and c. Capacitor 18a is connected via switch 23a to a variable voltage source represented by a potentiometer 24. The basic white light fraction can be adjusted by means of this potentiometer before the setting-up and exposure operations in order to facilitate fixing of the original.

Figure 3:
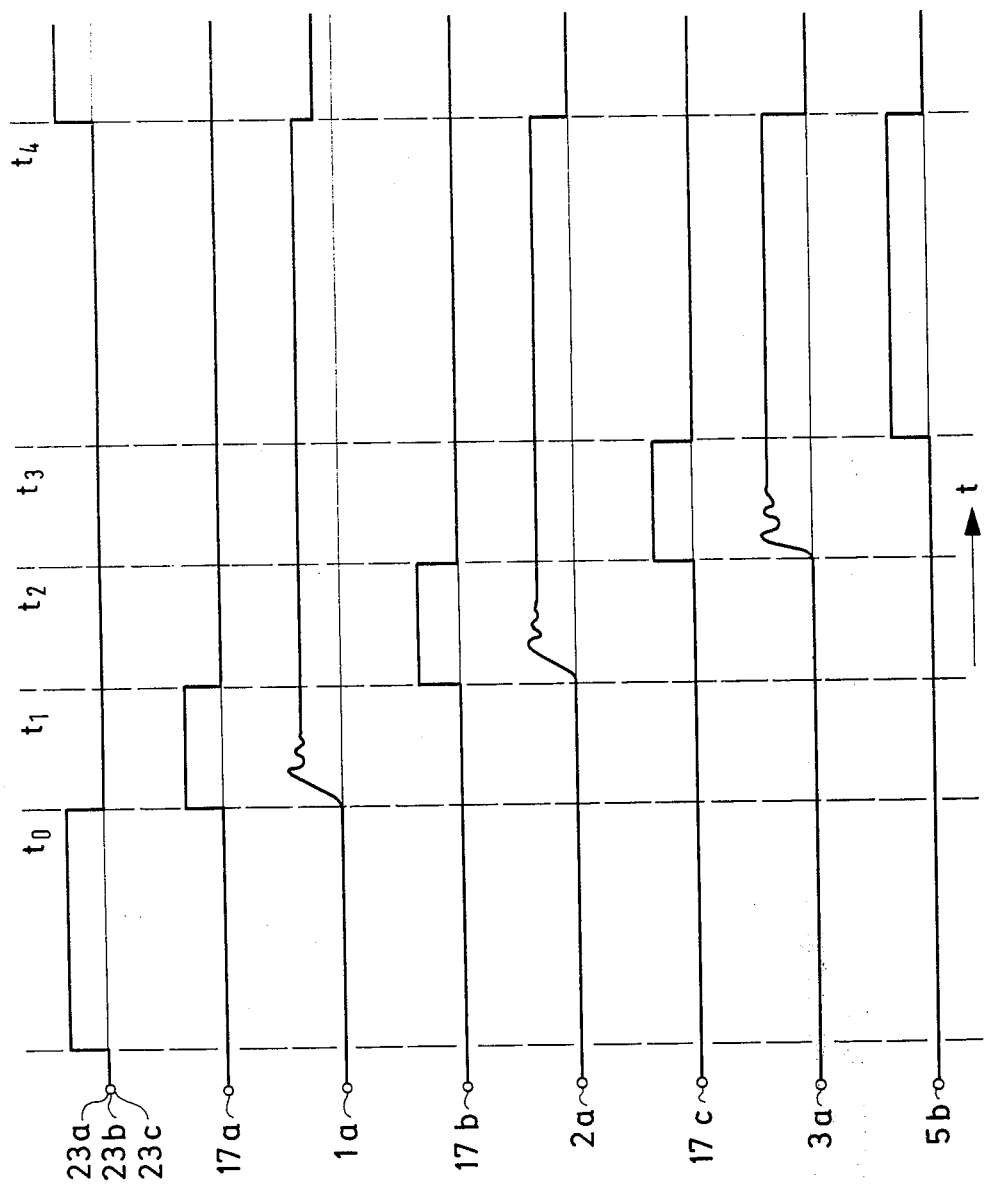

FIG. 3 is a diagram showing the sequence of the complete printing operation, which breaks down into four active stages preceded by a quiescent stage in which the original is fixed in its mount. The switches 23a, b and c are closed and the white lamp delivers a steady light during this stage. The first active stage starts at the time $t_0$. Switches 23a, b and c are opened and at the same time switch 17a is closed. The control operation for the white light thus starts, and this is shown in FIG. 3 by the line marked with the reference for the corresponding lamp 1a. The control operation for the white light is over at the time $t_1$ and the control signal of element 16a is stored in the capacitor 18a. The second active stage is now initiated by opening the switch 17a and closing the switch 17b. During this stage the yellow light is controlled to its set value. The second active phase is over at the time $t_2$ and the third active stage is initiated similarly by opening the switch 17b and closing the switch 17c, and in this stage the red-light is controlled. This stage and hence the entire setting-up control process are over at the time $t_3$. Switch 17c is now re-opened and the shutter 5b is moved out of the path of the rays of the printing light. The fourth active stage is thus the exposure stage, which is over at the time $t_4$. All three switched 23a, b and c are then closed to re-initiate a quiescent stage and at the same time the signals stored in the capacitors 18a, b and c are erased.

The most advantageous way of selecting the colours of three mixed-light fractions is as follows: that additive colour which, with the particular film material used, required the smallest amount of light to produce the required colour density on the printing material, is contained only in the white light, while the primary colour requiring the greatest amount of light is contained in all three mixed-light fractions. The first- mentioned primary colour in the present case is blue and the second primary colour is red. The colour of the other mixed-light fraction is accordingly yellow, that is, green plus red.

As will be apparent from the above explanations, the energy emitted by the lamps 1a and 3a is utilised much better in the new method than in the known method using a mixed light consisting of the three additive primary colours. The reason for this is that in the method according to the invention the full illuminating power or entire spectrum is utilised for printing purposes in the case of one of the light sources, only a single primary colour is filtered out of the entire spectrum in the case of the other light source, and, as was hitherto conventional, two additive primary colours are filtered not only in the case of the third of the three light sources. Consequently the light yield is much higher than in the case of exposure with three lamps each in one of the primary colours. At the same time the total exposure time is reduced since the primary colour which prints most slowly (in this case red) is statistically represented most strongly.

I claim:
1. A light source of adjustable colour, comprising three light emitters of separately adjustable intensity, a light mixer adapted to mix light emitted by the emitters into one beam, and filtering means whereby the first emitter emits light containing one additive primary colour, the second emitter emits light containing the same colour and one other additive primary colour, and the third emitter emits light of all three additive primary colours.

2. Apparatus for printing coloured originals, comprising means for mounting an original, means for focussing an image of the original on a surface to be printed, means for mounting a surface to be printed at the image position, and a light source for illuminating said original, comprising three light emitters of separately adjustable intensity, a light mixer adapted to mix light emitted by the emitters into one beam, and filtering means whereby the first emitter emits light containing one additive primary colour, the second emitter emits light containing the same colour and one other additive primary colour, and the third emitter emits light of all three additive primary colours.

3. Apparatus according to claim 2, comprising filtering means constituted by a red filter for the first emitter and a yellow filter for the second emitter.

4. Apparatus according to claim 3, in which the filtering means includes a filter for the third emitter with a light magenta or blue cast.

5. Apparatus according to claim 2, including a shutter removably interposed between the focussing means and the printing surface mounting means; first, second and third photoelectric transducers sensitive to said one additive primary colour, said one other additive primary colour and the remaining additive primary colour, respectively; first, second and third intensity control means connected to the first, second and third transducers, respectively; and to the first, second and third light emitters, respectively.

6. Apparatus according to claim 5, in which the control means are each constituted by a desired value input, a desired value/actual valve comparison stage, a controller, and adjusting means for adjusting the intensity of the respective light emitter.

7. Apparatus according to claim 6, in which the controllers are integral-proportional controllers.

8. Apparatus according to claim 6, including a three store, and a switch connecting each store to a respective store.

9. Apparatus according to claim 8, in which the store is an integrating store.

10. Apparatus according to claim 6, including feedback loops which by-pass each adjusting means, to compensate for variations in the voltage over the respective light emitter.

11. A method for providing light of adjustable colour, comprising the steps of filtering the light emitted by three light emitters to provide a first beam of light of one additive primary colour, a second beam of light comprising said additive primary colour and one other, and a third beam containing all three additive primary colours; and mixing the light from the emitters to provide one beam.

12. A method of printing coloured originals, comprising the steps of exposing an original to light comprising three fractions the first fraction comprising light of one additive primary colour, the second fraction comprising light of said one colour and one other additive primary colour, and the third fraction including light of all three additive primary colours; sensing the relative intensity of each additive primary colour in the light emitted from the original; adjusting the relative intensity of each fraction so that the light from the original corresponds with predetermined criteria; and throwing an image of the original on a surface to be printed.

13. A method according to claim 12, including the steps of using a photographic film as the surface to be printed, and arranging the filtering means so that said one colour is that which requires the longest exposure time.

* * * * *